Aug. 5, 1958     B. M. PRICE     2,845,803
WINDSHIELD WIPER
Filed July 5, 1957     2 Sheets-Sheet 1
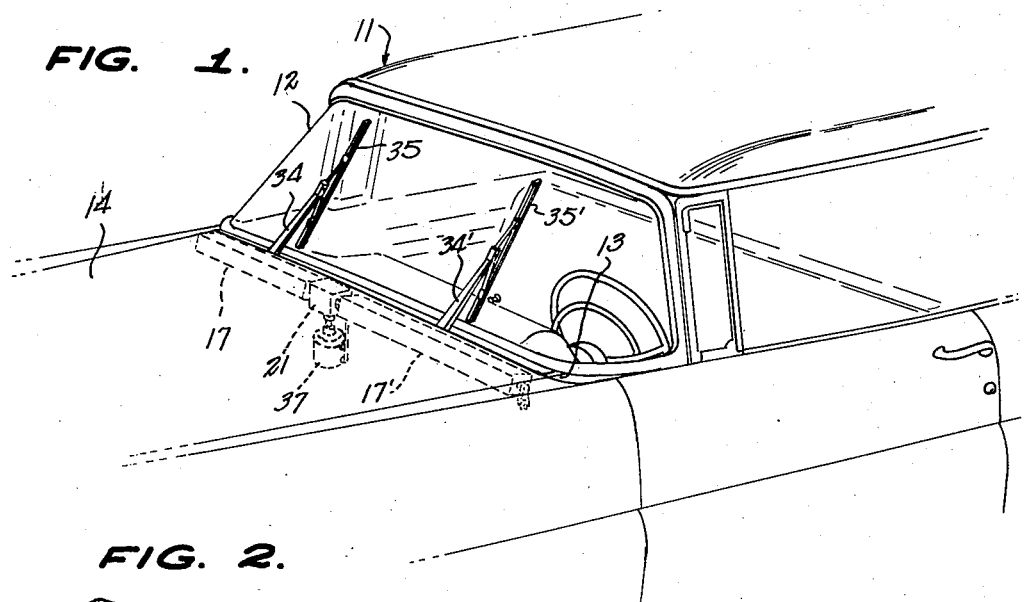
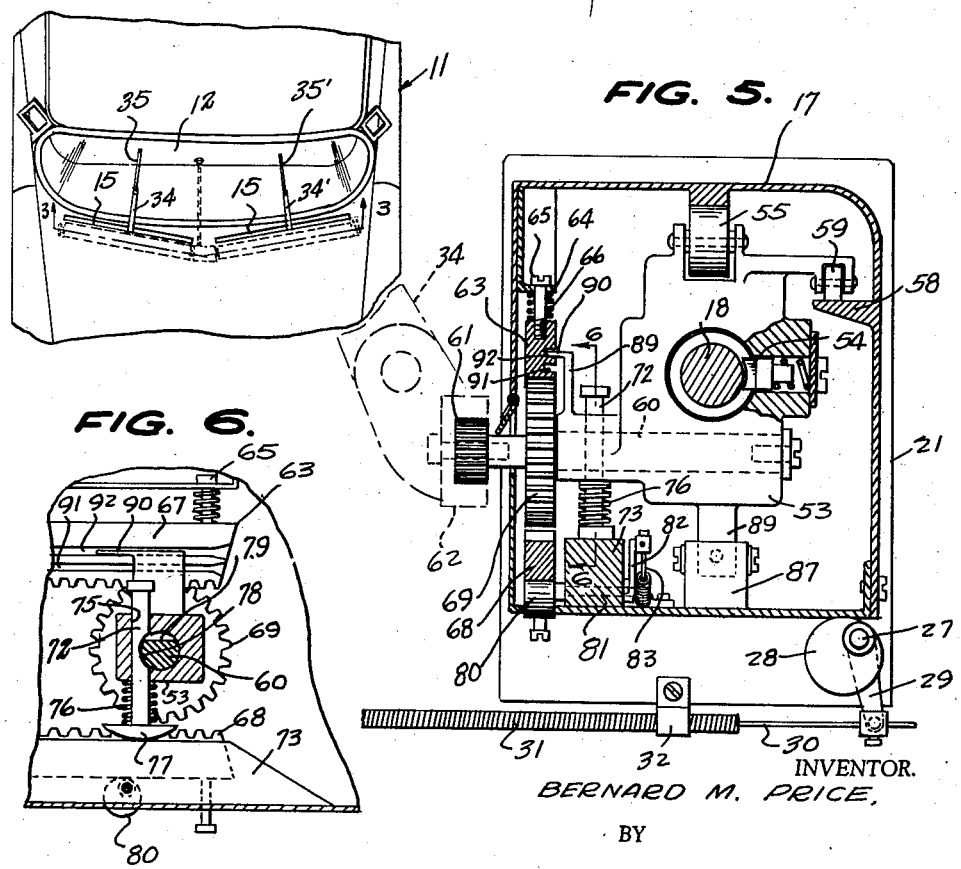
INVENTOR.
BERNARD M. PRICE, Aug. 5, 1958
B. M. PRICE
2,845,803
WINDSHIELD WIPER
Filed July 5, 1957
2 Sheets-Sheet 2
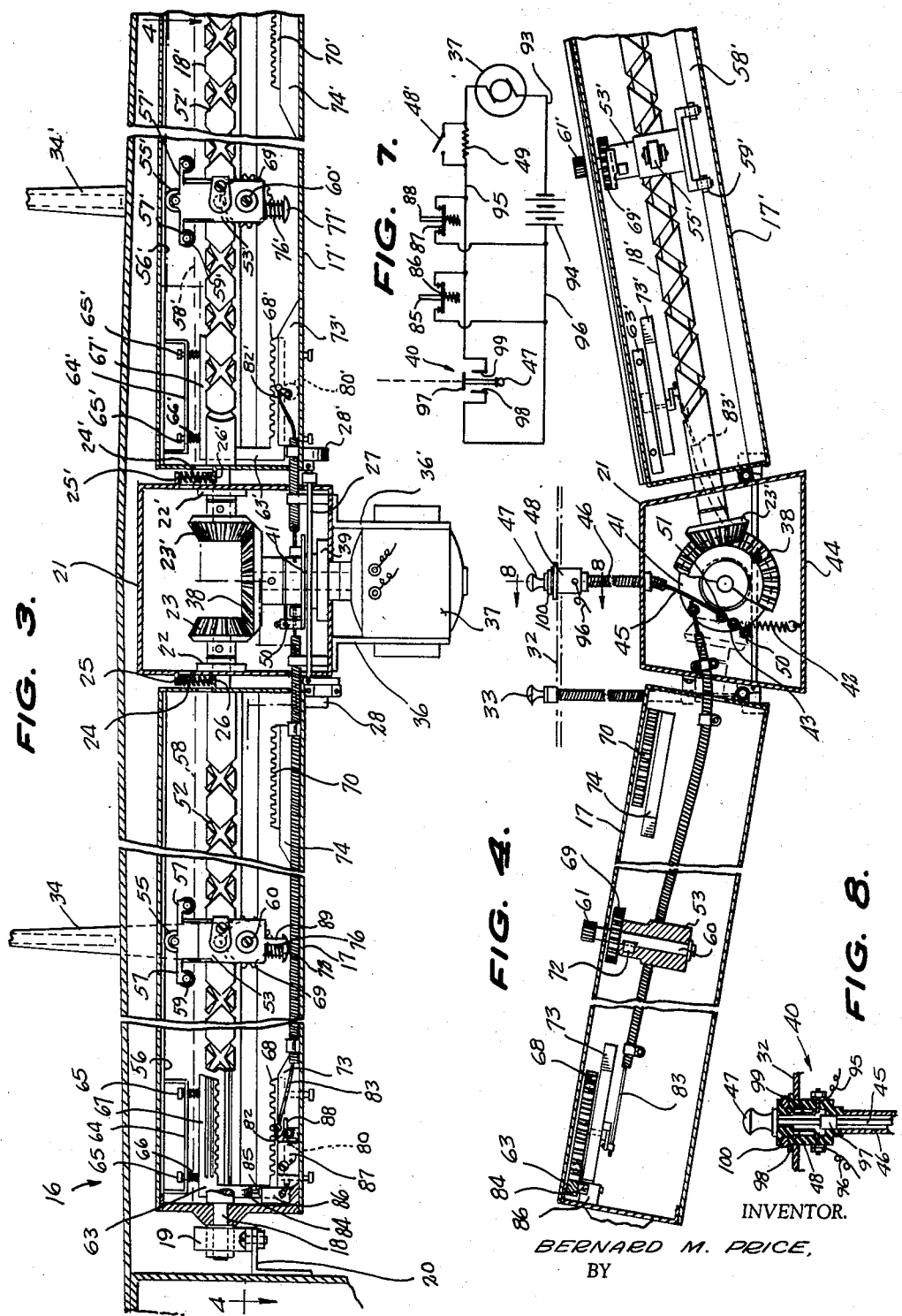
INVENTOR.
BERNARD M. PRICE,
BY
McMorrow, Berman + Davidson
ATTORNEYS.

United States Patent Office 2,845,803
Patented Aug. 5, 1958

2,845,803

WINDSHIELD WIPER

Bernard M. Price, Marmet, W. Va.

Application July 5, 1957, Serial No. 670,119

5 Claims. (Cl. 74—57)

This invention relates to windshield wipers for motor vehicles, and more particularly to a windshield wiper mechanism adapted to provide rectilinear as well as oscillating motion of the windshield wiper blades.

A main object of the invention is to provide a novel and improved windshield wiper mechanism for a motor vehicle, said mechanism being simple in construction, being relatively compact in size, and being automatic in operation.

A further object of the invention is to provide an improved windshield wiper mechanism which is arranged so that the windshield wiper blades thereof move rectilinearly as well as angularly and wherein the pressure of the blades on the windshield may be at times increased so as to provide greater effectiveness in removing sleet, frost or snow from the windshield.

A still further object of the invention is to provide an improved windshield wiper mechanism which is relatively inexpensive to manufacture, which is reliable in operation, and which provides a means of clearing substantially the entire area of the windshield, rather than the limited areas cleared in the windshield wiper mechanisms heretofore employed.

Further objects and advantages of the invention will become apparent from the following description and claims, and from the accompanying drawings, wherein:

Figure 1 is a perspective view of the windshield of a motor vehicle provided with an improved windshield wiper mechanism according to the present invention.

Figure 2 is a top view of the structure illustrated in Figure 1.

Figure 3 is an enlarged vertical cross sectional view taken substantially on the line 3—3 of Figure 2.

Figure 4 is a horizontal cross sectional view taken substantially on the line 4—4 of Figure 3.

Figure 5 is an enlarged transverse vertical cross sectional view taken through the left end portion of the wiper mechanism of Figures 1, 2 and 3, with the carriage member in rack-engaging position.

Figure 6 is an enlarged cross sectional detail view taken on the line 6—6 of Figure 5.

Figure 7 is a schematic electrical wiring diagram showing electrical connections of the windshield wiper device illustrated in Figures 1 to 6.

Figure 8 is an enlarged cross sectional detail view taken on the line 8—8 of Figure 4.

Referring to the drawings, 11 designates a motor vehicle provided with the usual windshield 12 and with a cowl portion 13 located between the hood 14 of the vehicle and said windshield 12. The cowl portion 13 is formed with a pair of slots 15, 15 symmetrically located therein and extending from the intermediate portion thereof laterally toward the opposite side margins thereof, as shown in Figure 2, said slots being thereby located immediately in front of the respective side portions of the windshield 12.

Designated generally at 16 is a windshield wiper mechanism according to the present invention, said mechanism comprising a pair of elongated housing members 17, 17' which are pivoted at their respective end portions on respective shafts 18, 18', the other of said shafts being rotatably received in bearing brackets 19 which are in turn mounted on angle brackets 20 secured to the adjacent side portions of the body of the motor vehicle. The inner ends of the shafts 18, 18' extend rotatably through the inner end walls of the housing 17, 17' and extend rotatably through respective side walls of an intermediate housing member 21, suitable bearing members 22, 22' being provided on said side walls for rotatably supporting the inner ends of the shafts 18, 18'. Respective bevel gears 23, 23' are mounted on the inner ends of said shafts, as shown in Figure 3.

The intermediate housing member 21 is rigidly secured in any suitable manner to the vehicle body, so that said inner housing member 21 is held stationary with respect to the vehicle body.

Respective coiled springs 24, 24' are mounted between opposing pairs of lugs 25, 26 and 25', 26' formed in the adjacent vertical wall portions of the housing members 17, 21 and 17', 21', as shown in Figure 3, the springs 24, 24' being spaced from the axes of the shafts 18, 18', said springs being arranged to bias the housing members 17, 17' downwardly and forwardly, namely, in a clockwise direction, as viewed in Figure 5, into engagement with suitable stop means, not shown.

As shown in Figure 5, a horizontal cam shaft 27 is journaled in the lower portion of the intermediate housing 21, extending through the opposite ends of said housing and having respective eccentric cams 28, 28' rigidly secured to its opposite ends, underlying the forward marginal portions of the bottom walls of the respective housing members 17, 17'. The shaft 27 is provided with a depending arm 29 to which is connected the end of a Bowden cable 30 whose sheath 31 is suitably supported by a bracket 32 fastened to the adjacent end wall of housing 21, the cable extending through the fire wall of the vehicle and through the dashboard 32 thereof, terminating in a suitable control knob 33. The control knob 33 is within easy reach of the vehicle operator, so that by pulling on said control knob, the operator may rotate the shaft 27, causing the cams 28, 28' to exert an upward lifting force on the forward portions of the housing members 17, 17', causing said housing members to be rotated counterclockwise, as viewed in Figure 5, whereby the windshield wiper arms, shown at 34, 34' and the associated windshield wiper blades 35, 35' are urged against the windshield 12 with increased pressure. This provides increased contact pressure of the windshield wiper blades 35, 35' against the windshield 12, if desired, for removing sleet, frost, or snow from the windshield.

Secured to the bottom wall of the stationary intermediate housing 21 are a pair of motor-supporting brackets 36, 36' between which is mounted an electric motor 37, the shaft of the motor being vertical and extending rotatably through the bottom wall of housing 21. Secured to the top end of the shaft is a bevel gear 38 which meshes with the bevel gears 23, 23', as shown in Figure 3. Thus, energization of the motor 37 causes the shafts 18, 18' to be simultaneously rotated.

The shaft of motor 37 extends rotatably through a sleeve or collar 39 secured to the bottom wall of the housing member 21. Rotatably mounted on the collar member 39 is a disc member 41 which is operated by a Bowden cable 45 which extends through its sheath 46 and which is provided with a control knob 47 located on the instrument panel 32 of the motor vehicle. The Bowden cable 45 extends slidably through an apertured abutment pin 43 secured on the disc member 41, and secured to the cable 45 on opposite sides of the abutment pin 43 are the spaced abutment collars 50 and 51. A coiled spring 42 is connected between the abutment collar 50 and the front wall 44 of housing 21 to bias the disc member 41 counterclockwise, as viewed in Figure 4.

The Bowden cable 45 extends through a switch housing 48 secured to the dashboard 32, as shown in Figure 8, and is provided with a conductive plunger element 97 which is movable into bridging engagement with a pair of spring contacts 98 and 99 responsive to a pull exerted on the control knob 47. The switch assembly thus defined is designated generally at 40 and comprises an arrangement whereby a preliminary pull exerted on the switch control knob 47 will move the plunger element 97 into bridging engagement with the contacts 98 and 99, this being resisted by the tension of the biasing spring 42. As will be presently explained, when the disc 41 is rotated by the subsequent engagement of the abutment collar 50 with the abutment pin 43, the plunger element 97 may be moved into further sliding engagement between the spring contacts 98 and 99 and the biasing force of spring 42 will be overcome and sustained by means presently to be described, so that the switch 40 remains closed until the knob 47 is returned to its normal position.

Rotatably mounted on the switch housing 48 is a ring member 100 forming part of a rotatable switch assembly 48' which is operated independently of the switch assembly 40 and which is connected across a speed-reducing resistor 49 connected in the motor circuit. The rotary switch 48' is entirely conventional in construction and only the rotary ring element 100 thereof is disclosed in Figure 8. Suitable contacts are provided which are closed responsive to manual rotation of the ring member 100, so that the speed-reducing resistor 49 may be at times shunted to provide maximum motor speed.

It will be understood that the switch housing 48 is of insulating material so that the conductive contact elements 98 and 99 will be normally insulated from each other. Suitable terminals are provided on the housing 48 which are electrically connected to the contact elements 98 and 99 and which may be connected in the external circuit in which the switch device 40 is employed, as will be presently described.

By this arrangement the knob 47 may be pulled outwardly sufficiently to close the switch 40 incorporated in the switch housing 48, as described immediately above, whereby to energize the motor 37 without immediately causing rotation of the disc 41. As will be presently described, this is necessary in order to start the windshield wiper mechanism.

The respective shafts 18, 18' are formed with continuous threads comprising crossed forward and reverse helical grooved portions connected at their ends by reversing grooves, known as "Yankee" threads, and designated at 52, 52'. Designated respectively at 53, 53' are carriage members mounted on the shafts 18, 18' and provided with spring biased thread-engaging members 54 which are engaged in the respective threads 52, 52' in the manner illustrated in Figure 5, whereby to cause the carriage members 53 and 53' to follow the respective threads 52, 52' responsive to the rotation of the shafts 18, 18'. The top end portions of the respective carriage members 53, 53' are provided with guide rollers 55, 55' which engage beneath guide rails 56, 56' provided on the under surfaces of the top walls of the respective housing members 17, 17'. Longitudinally extending pairs of arms 57, 57 and 57', 57' project from the opposite ends of the top portions of the carriage members 53, 53' and engage on horizontal supporting flanges 58, 58', suitable rollers 59, 59' being journaled in the ends of the arms 57 and 57' to engage the supporting flanges 58, 58', and to cooperate with the rollers 55, 55' to stabilize the carriage members 53, 53' as they move along the shafts 18, 18'.

Transversely journaled in the respective carriage members 53, 53' are the windshield wiper shafts 60, 60' which extend through apertures provided in the rear walls of the housing members 17, 17' and which are provided on their ends with the pinions 61, 61' adapted to be secured in the conventional socket elements 62 of the windshield wiper arms 34, 34' so as to support said arms in upstanding positions projecting through the cowl slots 15, 15.

As will be presently described, the arms 34, 34' are maintained in upstanding positions while they travel through the intermediate portions of the slots 15, 15.

Movably mounted in the left ends of the respective housing members 17, 17', as viewed in Figure 3, are respective generally U-shaped rack members 63, 63', said rack members being vertically mounted and being suspended from respective U-shaped bracket bars 64, 64' secured to the top walls of the respective housing members 17, 17'. Suspension bolts 65, 65 and 65', 65' extend slidably through apertures in the bight portions of the bracket members 64, 64' and are threadedly secured in the top bar elements of the respective U-shaped rack bars 63, 63', coiled springs 66, 66' being provided beneath said bight portions to bias the rack bars 63, 63' downwardly.

Each of the U-shaped rack members 63 and 63' comprises a pair of top and bottom rack bars, shown at 67, 68 and 67', 68', said rack bars having inwardly facing teeth, the upper rack bars 67, 67' being provided with downwardly facing teeth and the lower rack bars 68, 68' being provided with upwardly facing teeth, as is clearly shown in Figure 3. Mounted on the respective windshield wiper shafts 60, 60' are respective rack gears 69, 69' which are meshingly engageable with the upper rack bars 67, 67' when the U-shaped rack members 63, 63' are in their lowered positions and which are meshingly engageable with the lower rack bars 68, 68' when the rack members 63, 63' are in elevated positions, as will be subsequently explained.

Mounted on the bottom walls of the respective housing members 17, 17', adjacent the right ends of said housing members, are the respective rack bars 70, 70' having upwardly facing teeth, as shown in Figure 3, and being meshingly engageable with the pinion gears 69, 69' when the respective carriage members 53, 53' are adjacent the right ends of the housing members 17, 17', as viewed in Figure 3.

As will be readily understood, when the pinion gears 69, 69' engage with the rack bars, the windshield wiper arms 34, 34' are caused to oscillate, whereby the windshield wiper blades are oscillated when the carriage members 53, 53' are in the respective opposite end portions of the housing members 17, 17'.

As shown in Figure 4, the rack elements at the opposite ends of the respective housings 17, 17' are mounted in the same vertical planes, said planes also being the same as the vertical planes of the pinion members 69, 69'. Thus, although the respective housings 17, 17' are angled relative to each other, as shown in Figure 4, within the housings, the pinions 69, 69' are in the same vertical planes as their associated rack members 63, 70 and 63', 70'.

Respective vertical follower members 72, 72' extend through and depend from the rear portions of the carriage members 53, 53', the bottom ends of the follower members 72, 72' being engageable with guide ramps provided on the bottom walls of the respective housings 17, 17' to guide the associated carriage members so that their rack gears 69, 69' engage the rack bar elements at the respective end portions of the housings. Thus, the housing 17 is provided with the guide ramps 73 and 74 respectively at its left and right ends, and the housing 17' is provided with the guide ramps 73', 74' respectively at its left and right ends. The follower members 72, 72' are vertically slidable in bores 75 formed in the respective carriage members 53, 53' and are biased downwardly by respective coiled springs provided thereon, shown at 76, 76', bearing between the bottom surfaces of the carriage members and the head portions 77, 77' of the follower members. The shank portions of the follower members 72, 72' are formed at their intermediate portions with arcuate transverse notches 78, as shown in Figure 6, in which the windshield wiper shafts 60, 60' are rotatably receivable when the follower members have been elevated by their associated ramps. Thus, the shafts 60, 60' are free to rotate when the follower members have been thus elevated. The shafts 60, 60' are formed with cylindrical transverse grooves 79, as shown in Figure 6, engageable with the shank portions 72, 72' when the shank portions are in lowered positions, namely, when the carriage members 53, 53' are in the intermediate portions of their respective housings 17, 17', whereby under these conditions, the shafts 60, 60' are locked against rotation, and whereby the associated windshield wiper arms 34, 34' are locked in upright positions.

As will be apparent from Figure 6, when the follower members are elevated, the arcuate notches 78 register with the shafts 60, 60', allowing the shafts to rotate from their locked positions. When the follower members are lowered, by the action of the biasing springs 76, 76', the shafts 60, 60' lockingly engage with the follower members at their arcuate notches 79, whereby the shafts 60, 60' cannot rotate, as above stated.

Pivoted to the respective ramp members 73, 73' subjacent the respective U-shaped rack members 63, 63' are respective eccentric cams 80, 80' cammingly engageable beneath the respective rack bar elements 73, 73'. The eccentric cams are provided with pivot shafts 31 which extend rotatably through the associated ramp members 73, 73' and are provided at their inner ends with crank arms 82, 82' shown in Figure 5, connected by respective Bowden cables 83, 83' to diametrically opposite points on the manually rotatable disc member 41.

As above explained, lost motion is provided between the Bowden cable 45 and the abutment element 43 on the disc member 41, allowing switch 40 to be closed when a preliminary pull is exerted on the control knob 47. When the abutment element 50 engages the abutment element 43, torque may be exerted on the disc member 41 to rotate same, said torque being transmitted by the Bowden cables 83, 83' to the respective eccentric cams 80, 80', whereby the U-shaped rack members 63, 63' are elevated, responsive to the rotation of the disc member 41 in a clockwise direction, as viewed in Figure 4. As above explained, elevation of the U-shaped rack members 63, 63' aligns the lower rack bar elements 68, 68' with the teeth of the rack gears 69, 69' for meshing engagement therewith.

A sufficient amount of rotation of disc member 41 is provided so that the cams 80, 81 may be rotated to dead center positions, maintaining the rack members 63, 63' elevated when the control knob 47 is released after a predetermined pull has been exerted thereon. Conversely, the rack members 63, 63' may be lowered when the knob 47 is pushed inwardly to its normal, non-working position. The return of the knob 47 to said non-working position also opens the switch 40.

A lug 84 projects outwardly from the bight portion of the U-shaped rack member 63, said lug being engageable with the plunger element 85 of a microswitch 86 mounted in the bottom left end portion of housing 17, as shown in Figure 3. Microswitch 86 is of the normally closed type, namely, closes when its plunger element 85 is released, as by the elevation of the U-shaped rack member 63.

As shown in Figure 7, the microswitch 86 is connected in parallel with the manual control switch 40.

A second microswitch 87 is mounted on the bottom wall of housing member 17 subjacent the path of movement of the carriage member 53 and is located adjacent the intermediate portion of the bottom rack bar element 68. The microswitch 87 has an operating element 88 engageable by a depending finger 89 provided on the carriage member 53. As shown in Figure 7, the microswitch 87 is connected in parallel with switches 86 and 40.

The rear portion of carriage member 53 is formed with an upwardly projecting locking finger 89 having a horizontally extending lug 90 selectively engageable in a pair of vertically spaced horizontal grooves 91 and 92 formed in the forward face of the upper rack bar element 67. The finger lug 90 engages in the upper locking groove 92 when the rack member 63 is in its lowered position and engages in the lower locking groove 91 when the rack member 63 is in its elevated position. The locking lug 90 thus maintains the rack member 63 in either its elevated or lowered position until the carriage member 53 moves away from the rack member 63 sufficiently to allow the lug 90 to disengage from the locking groove 91 or 92.

As shown in Figure 7, one terminal of the motor 37 is connected by a wire 93 to one terminal of the vehicle battery 94. This may be, for example, the grounded terminal of the vehicle battery. The opposite terminal of the motor 37 is connected through the parallel-connected resistor 49 and switch 48' to a wire 95. The respective switches 40, 86 and 87 are connected between the wire 95 and a wire 96 connected to the remaining terminal of the motor vehicle battery 94.

When the windshield wipers are not in operation, the respective rack members 63, 63' are in lowered positions and the carriage members 53, 53' are in the left end portions of the housings 17, 17', as viewed in Figure 3, with the pinion gears 69, 69' meshingly engaged with the upper rack bars 67, 67' at the intermediate portions of said rack bars, whereby the windshield wiper arms 34, 34' will be in inclined positions rotated to the right, as viewed in Figure 1, with the blades 35, 35' almost horizontal. To start the mechanism the knob 47 is first pulled out to a preliminary amount, sufficient to close the switch 40, but insufficient to rotate the disc member 41. The knob 47 is then held in this position against the tension of the spring 42, whereby motor 37 becomes energized and rotates the shafts 18, 18'. The carriage members 53, 53', in their starting positions, are substantially at the left ends of the "Yankee" threads 52, 52', whereby the carriage members 53, 53' move to the right as shafts 18, 18' rotate. Since the rack members 63, 63' are in their lowered positions, the locking lug 90 engages in the upper locking groove 92, preventing the rack bars 63, 63' from being elevated until the carriage members 53, 53' clear the rack members 63, 63', as above explained.

As the carriage members 53, 53' move to the right, as viewed in Figure 3, the windshield wiper blade arms 34, 34' are rotated to upright positions by the cooperation of the rack gears 69, 69' with the upper rack bar elements 67, 67', so that said arms 34, 34' are upright when the carriage members 53, 53' clear the rack members 63, 63', moving to the right. This action occurs in a relatively short period of time during which the knob 47 is held by the operator. As soon as the carriage members 53, 53' clear the rack members 63, 63', the operator pulls the knob 47 outwardly sufficiently to elevate the rack members 63, 63' by the action of the eccentric cams 80, 80', as above described, after which the operator can release the knob 47, allowing the mechanism to continue in operation. When the follower members 72, 72' disengage from their ramps 73, 73', the wiper shafts 60, 60' are locked by the engagement of their grooves 79 with the shank portions of the follower members, as above described, causing the arms 34, 34' to be locked in upright positions. The arms and windshield wiper blades 35, 35' are thus caused to travel rectilinearly across the windshield until the rack gears 69, 69' meshingly engage with the lower rack members 70, 70', at which positions the follower members engage the ramp elements 74, 74' elevating the follower members 72, 72', and again releasing the windshield wiper shafts 60, 60' for rotation. Thus, the blades 35, 35' oscillate when the carriage members reach the right end portions of the housings 17, 17'. The oscillation continues until the carriage members 53, 53', in their reverse movements clear the ramps 74, 74' and the rack members 70, 70', whereby the arms 34, 34' are again locked in upright positions. The leftward movement of the carriage members 53, 53' continues until the rack gears 69, 69' engage the lower rack elements 68, 68' of the elevated rack members 63, 63', and at which time the follower members 72, 72' engage with the ramps 73, 73', allowing the windshield wiper arms to again be oscillated.

The above action may continue as long as the operator desires. As above explained, if additional cleaning pressure is required the knob 33 may be pulled outwardly, allowing the wiper blades 35, 35' to be pressed against the windshield with increased force, sufficient to remove sleet, frost or snow from the windshield.

Reduction in speed may be obtained by opening the switch 48', which may be accomplished by rotating the conventional actuating element thereof to place the speed-reducing resistor 49 in the motor circuit, as above explained.

To terminate the operation of the mechanism, the knob 47 is returned to its non-working position, whereby the slide switch 40 is opened. This also rotates the disc member 41 in a counter-clockwise direction, as viewed in Figure 4, because of the engagement of the abutment element 51 with the abutment element 43. The eccentric cams 80, 81 are rotated to allow the U-shaped rack members 63, 63' to be lowered. However, if the carriage member 53 is engaged with the rack member 63, the lowering of the rack member 63 cannot occur until the locking finger 90 disengages from the lower locking groove 91. This can only occur when the carriage member 53 moves to the right away from the U-shaped rack member 63 and clears same. At this time the rack member 63 descends, causing the lug 84 to engage the plunger element 85, opening switch 86. However, motor 37 remains energized since the microswitch 87 remains closed. The carriage members 53, 53' continue their movement to the right and reverse, the action continuing until the depending lug 89 engages the microswitch plunger element 88, causing switch 87 to open. At this point the parts are restored to their initial rest positions wherein the arms 34, 34' are rotated to the right, as viewed in Figure 1, and the blades 35, 35' are in substantially horizontal positions adjacent the lower margin of the windshield. Since the switches 40 and 86 were previously opened, motor 37 becomes deenergized as soon as microswitch 87 is opened, as above explained.

While a specific embodiment of an improved windshield wiper mechanism has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a windshield wiper, a support, a drive screw journaled horizontally in said support, said screw having a continuous thread comprising crossed forward and reverse helical groove portions connected at their ends by reversing grooves, a carriage member engaging said drive screw, a windshield wiper shaft journaled in said carriage member, a horizontal rack bar movably mounted adjacent the end of the drive screw, a pinion gear on said wiper shaft at times meshingly engageable with said rack bar, whereby to oscillate said shaft when the carriage member moves toward and returns from said end of the drive screw, a drive motor coupled to said screw, a source of current, circuit means connecting said drive motor to said source of current and including first, second and third parallel-connected switches, manually operated means controlling said first switch, means on the rack bar controlling said second switch, means on the carriage member controlling said third switch, and manually operated means controlling the movement of said rack bar.

2. In a windshield wiper, a support, a drive screw journaled horizontally in said support, said screw having a continuous thread comprising crossed forward and reverse helical groove portions connected at their ends by reversing grooves, a carriage member engaging said drive screw, a windshield wiper shaft journaled in said carriage member, a rack member comprising top and bottom opposing rack bars, means supporting said rack member for vertical movement adjacent the end of the drive screw, a pinion gear on said wiper shaft at times meshingly engageable with either said top or bottom rack bar, whereby to oscillate said shaft when the carriage member moves toward and returns from said end of the drive screw, a drive motor coupled to said screw, a source of current, circuit means connecting said drive motor to said source of current and including, first, second and third parallel-connected switches, manually operated means controlling said first switch, means on the rack bar controlling said second switch, means on the carriage member controlling said third switch, manually operated means controlling the movement of said rack member and being formed and arranged to elevate said rack member to a position wherein said pinion gear is meshingly engageable with the lower rack bar, and means biasing said rack member to a lowered position wherein said pinion gear is meshingly engageable with the upper rack bar.

3. In a windshield wiper, a support, a drive screw journaled horizontally in said support, said screw having a continuous thread comprising crossed, forward and reverse helical groove portions connected at their ends by reversing grooves, a carriage member engaging said drive screw, a windshield wiper shaft journaled in said carriage member, a rack member comprising top and bottom opposing rack bars, means supporting said rack member for vertical movement adjacent the end of the drive screw, a pinion gear on said wiper shaft at times meshingly engageable with either said top or bottom rack bar, whereby to oscillate said shaft when the carriage member moves toward and returns from said end of the drive screw, a drive motor coupled to said screw, a source of current, circuit means connecting said drive motor to said source of current and including, first, second and third parallel-connected switches, and manually operated means controlling said first switch, means on the rack member opening said second switch when the rack member is in lowered position, means on the carriage member controlling said third switch, manually operated means controlling the movement of said rack member and being formed and arranged to elevate said rack member to a position wherein said pinion gear is meshingly engageable with the lower rack bar, and means biasing said rack member to a lowered position wherein said pinion gear is meshingly engageable with the upper rack bar.

4. In a windshield wiper, a support, a drive screw journaled horizontally in said support, said screw having a continuous thread comprising crossed forward and reverse helical groove portions connected at their ends by reversing grooves, a carriage member engaging said drive screw, a windshield wiper shaft journaled in said carriage member, a rack member comprising top and bottom opposing rack bars, means supporting said rack member for vertical movement adjacent the end of the drive screw, a pinion gear on said wiper shaft at times meshingly engageable with either said top or bottom rack bar, whereby to oscillate said shaft when the carriage member moves toward and returns from said end of the drive screw, a drive motor coupled to said screw, a source of current, circuit means connecting said drive motor to said source of current and including first, second and third parallel-connected switches, manually operated means controlling said first switch, means on the rack member opening said second switch when the rack member is in lowered position, and means on the carriage member opening said third switch when the carriage member is adjacent the end of the drive screw, manually operated means controlling the movement of said rack member and being formed and arranged to elevate said rack member to a position wherein said pinion gear is meshingly engageable with the lower rack bar, and means biasing said rack member to a lowered position wherein said pinion gear is meshingly engageable with the upper rack bar.

5. In a windshield wiper, a support, a drive screw journaled horizontally in said support, said screw having a continuous thread comprising crossed forward and reverse helical groove portions connected at their ends by reversing grooves, a carriage member engaging said drive screw, a windshield wiper shaft journaled in said carriage member, a rack member comprising top and bottom opposing rack bars, means supporting said rack member for vertical movement adjacent the end of the drive screw, a pinion gear on said wiper shaft at times meshingly engageable with either said top or bottom rack bar, whereby to oscillate said shaft when the carriage member moves toward and returns from said end of the drive screw, a drive motor coupled to said screw, a source of current, circuit means connecting said drive motor to said source of current and including first, second and third parallel-connected switches, manually operated means controlling said first switch, means on the rack member opening said second switch when the rack member is in lowered position, means on the carriage member opening said third switch when the carriage member is adjacent the end of the drive screw, manually operated means controlling the movement of said rack member and being formed and arranged to elevate said rack member to a position wherein said pinion gear is meshingly engageable with the lower rack bar, means biasing said rack member to a lowered position wherein said pinion gear is meshingly engageable with the upper rack bar, said rack member being formed with a pair of vertically spaced, horizontal, longitudinally extending locking grooves, and a locking projection on said carriage member slidably engageable in one or other of said locking grooves in accordance with the raised or lowered position of the rack member.

References Cited in the file of this patent
UNITED STATES PATENTS 2,785,430     Dyer et al. _____ Mar. 19, 1957